United States Patent [19]

Trutna, Jr. et al.

[11] Patent Number: 4,747,111
[45] Date of Patent: May 24, 1988

[54] QUASI-PLANAR MONOLITHIC UNIDIRECTIONAL RING LASER

[75] Inventors: William R. Trutna, Jr., Atherton; Moshe Nazarathy, Mountain View, both of Calif.

[73] Assignee: Hewlett-Packard Company, Palo Alto, Calif.

[21] Appl. No.: 14,751

[22] Filed: Feb. 13, 1987

[51] Int. Cl.$^4$ .......................... H01S 3/16; H01S 3/083
[52] U.S. Cl. ...................................... 372/94; 372/37; 372/66; 356/350
[58] Field of Search .............................. 372/94, 37, 66; 356/350

[56] References Cited

U.S. PATENT DOCUMENTS 4,578,793  3/1986  Kane et al. .............................. 372/50

OTHER PUBLICATIONS

Kane et al., "Monolithic, Unidirectional Single-Mode Nd:YAG Ring Laser", 2/1985, vol. 10, No. 2, Optics Letters, pp. 65-67.

Primary Examiner—James W. Davie
Assistant Examiner—Xuan Vo
Attorney, Agent, or Firm—John A. Frazzini

[57] ABSTRACT

A quasi-planar monolithic unidirectional ring laser is disclosed including an Nd:YAG crystal shaped so that a ring formed therein has an out-of-plane angle of about 1°. The reflection opposite the output-coupling point on the front face is off the rear face. This arrangement provides for a very low pumping threshold and reduced magnetic field requirements. The disclosed laser can be pumped with a semiconductor laser and yield single mode 1.319 μm and 1.338 μm outputs suitable for fiber optic communications.

15 Claims, 3 Drawing Sheets

QUASI-PLANAR MONOLITHIC UNIDIRECTIONAL RING LASER

BACKGROUND OF THE INVENTION

The present invention relates to ring lasers, and, more particularly, to solid state ring lasers.

Optical communications systems require lasers which are compatible with optical fibers and provide stable single-mode transmissions sufficiently narrow for high-baud rate heterodyne detection systems. To be commercially viable, the laser sources should have low power requirements, high reliability, modest size and reasonable cost.

Typical optic fibers transmit wavelengths of about 1.3 microns ($\mu$m) most efficiently. To accommodate a target rate of 100 megabaud of phase-shift keyed data, for example, requires a single-mode line width less than 200 kilohertz (kHz). The commercial requirements point to a solid-state system with a pump threshold low enough to be met by semiconductor lasers.

While seemingly meeting the commercial requirements for optical communications systems, conventional semiconductor lasers tend to run multimode, and thus are not well-suited to heterodyne detection methods, such as phase-shift keying. Some systems, e.g., those using distributed feedback, have achieved single-mode operation of semiconductor lasers. However, the line widths involved are on the order of 20 megahertz (MHz), much too broad for the targeted data rates.

A particularly promising class of solid-state lasers are based on crystals doped with a laser material, for example, yttrium aluminum garnet (YAG) crystal doped with neodymium, the combination being referred to as "Nd:YAG". As a laser medium, neodymium's output range includes wavelengths well-suited for optic fibers, e.g., 1.319 $\mu$m and 1.338 $\mu$m, and some secondarily acceptable wavelengths, such as 1.062 $\mu$m.

While neodymium can be used with several alternative crytal host materials, Nd:YAG has the advantage of a relatively low pump threshold. The low pump threshold is important to accommodate semiconductor lasers as pumping sources for the neodymium-doped crystal.

Solid-state laser media, such as Nd:YAG, are not well-suited for single-mode standing-wave oscillation since standing waves can deplete the gain in a spatially inhomogeneous way, inducing extraneous modes. By using the doped crystals in a unidirectional ring laser arrangement, the mode-shifting behavior can be minimized since the laser modes are traveling waves which deplete the gain more evenly.

Discrete implementations of ring lasers can include a laser medium, a polarizer, a half-wave plate and a Faraday rotator. Light emitted by the laser medium and polarized by the polarizer is rotated by the half-wave plate in a direction dependent on the direction of light travel about the ring. In contrast, the direction of polarization rotation induced by the Faraday rotator is independent of travel direction.

By way of example, assume both the half-wave plate and the Faraday rotator induce 10° polarization rotations. Light traveling clockwise about the ring would be subjected to two 10° rotations in the same direction, so that the total rotation is 20°. In contrast, light traveling in the counterclockwise direction would be subject to the opposing rotations, so the net rotation is 0°.

Consider light generated by a laser source and linearly polarized by a polarizer. If propagated in a ring through the Faraday rotator and the half-wave plate in a direction in which their effects cancel, the light can return to the polarizer with the originally imparted polarization. Hence, the returned light can proceed on its next trip around the ring with little loss at the polarizer. Light traveling in the opposite direction around the ring reaches the polarizer with a new polarization, so energy is absorbed by the polarizer as it repolarizes the beam. Lasing favors the direction of lower loss, which dominates to establish the unidirectional character of the laser.

Thus, Nd-doped crystal lasers including external polarizers and Faraday rotators arranged in a unidirectional ring configuration have provided narrow-band single-mode output suitable for optic fiber communications. A disadvantage of these discrete implementations is that they are very vulnerable to vibrations. Vibrations can cause frequency shifts in the laser output, which contributes to noise and interference upon detection. The discrete lasers are also disadvantageous due to bulk, expense, alignment tolerances and fragility.

The disadvantages of discrete implementations of the unidirectional ring laser are addressed by the "MISER", disclosed in U.S. Pat. No. 4,578,793 to Thomas J. Kane and Robert L. Byer. Kane and Byer also describe the MISER in "Monolithic, unidirectional single-mode Nd:YAG ring laser", *OPTICS LETTERS*, Vol. 10, No. 2, February, 1985.

The MISER embodies the elements required of a unidirectional ring laser in a monolithic design, which minimizes problems due to reliability and alignment tolerances that can plague discrete designs. The MISERS employs a Nd:YAG crystal as its laser medium. In the presence of an appropriately directed magnetic field, the crystal itself acts as the Faraday rotator. The out-of-plane total internal reflections (TIR) within the crystal perform a function comparable to that of the half-wave plate, and the outlet coupler at the front face acts as a partial polarizer.

In the disclosed MISER, a pump beam enters a front face of the crystal, and travels to and from the front face parallel to top and bottom faces of the crystal. However, two bevels near a rear face of the MISER crystal reflect the beams upward, causing the ring to include a point along the top face of the crystal. Thus the ring includes a large, e.g., roughly 90°, out-of-plane angle which induces a direction-independent polarization shift in light traveling about the ring.

The MISER disclosed in the references above requires a three kilogauss magnetic field and a 150 milliwatt (mW) pumping threshold to achieve about 5% efficiency at 1.06 $\mu$m. The three kilogauss magnetic field, if supplied by permanent magnets, requires an expensive rare earth magnet. The 150 mW and about pump power is supplied by a powerful argon laser. The length of the crystal is 38 millimeters (mm) and a coating applied to the front face of the crystal established an output coupling of 1.0%.

The advantages of monolithic design could find ample use in fiber optic communications systems. However, the specifications of the disclosed MISER are not well adapted for fiber optical systems. For example, it is not commercially practicable to power complex communications networks using argon ion lasers. Semiconductor diode lasers are more reliable, compact and cost effective. Unfortunately, they cannot approach the 150 mW pump threshold of the MISER. A much smaller pump output, such as 10 mW, is a more reasonable given the limitations of current smieconductor lasers.

Another concern is that most available optic fibers transmit light much more effectively at about 1.3 μm than at the 1.06 μm output obtained from the disclosed MISER. The difficulty of lowering the threshold under 10 mW is compounded by the fact that the inherent gain of the about 1.3 μm lines is only one-fourth that of the 1.06 μm line.

MISER specifications can be altered by varying certain parameters. For example, the crystal can be made smaller and the output coupling reduced. However, any advantages obtained in lower pump threshold would be at least partially offset by the greater magnetic field required to obtain unidirectional lasing. Relatively expensive rare-earth permanent magnets are required to achieve 3 kilogauss, and larger fields would greatly increase the cost of the incorporating system.

What is needed is a ring laser which provides the advantages of monolithic design, and which can provide 1.3 μm outputs with a pump threshold achievable by semiconductor diodes. In addition, the magnetic field required for Faraday rotation should be reasonable, preferably considerably below 3 kilogauss.

SUMMARY OF THE INVENTION

A quasi-planar unidirectional ring configuration provides reduced loss for the resonating mode and greater differential loss between opposing directions along the ring, substantially reducing the pump threshold and magnetic field requirements for monolithic laser-medium-doped crystals. "Quasi-planar" describes an orientation of a plane which is more closely aligned with a reference plane than it is to a plane orthogonal to the reference plane.

In its broadest sense, a quasi-planar ring can include an out-of-plane angle between 0° and 45°. However, in most cases, optimal performance can be obtained with an out-of-plane angle less than 10°. In fact, in many configurations, an out-of-plane angle of within a factor of two of 1.0° is appropriate.

The crystal medium for the ring can be geometrically shaped so that the desired ring configuration is imposed by internal reflections. In a crystal in which the front face serves as the output coupling port, a slanted rear face can serve as the locus of the center reflection defining the plane characterized by the out-of-plane angle.

Herein, in a ring defined by four internal reflections, one of which is the point at which the output is coupled, the "opposing out-of-plane angle" is the angle between the plane defined by the reflection opposite the output coupling point and the reference plane defined by the reflection at the output coupling point.

A four reflection ring has two other out-of-plane angles. A ring with more than four reflections can have several out-of-plane angles defined. Applied more generally, "quasi-planar" can be used to characterize the maximum minor angle over the planes defined by all internal reflections. (Two intersecting planes define two complementary angle magnitudes, a "major" angle greater than or equal to 90°, and a "minor" angle less than or equal to 90°. Herein, "out-of-plane" angles are minor, unless otherwise indicated.)

In a preferred embodiment of the present invention, a several millimeter long Nd:YAG crystal with its out-of-plane angle at about 1° provides stable single-mode 1.3 μm outputs with a threshold below 5 mW in a magnetic field of 100 Gauss. Thus, a monolithic semi-conductor laser suitable for optic fiber communications is provided. Further features and advantages are detailed below with reference to the following drawings.

DESCRIPTION OF THE PREFERRED EMBODIMENTS

Figure 1:
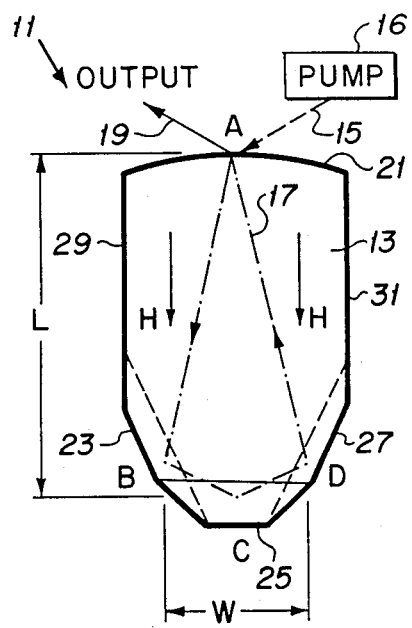
FIG. 1 is a schematic top plan view of a quasiplanar monolithic unidirectional ring laser in accordance with the present invention.

A quasi-planar ring laser 11 includes a laser medium crystal 13 disposed within a magnetic field H so that when pumped by a pump beam 15 from a laser pump 16, a ring 17 is established for generating an output 19, as shown in FIG. 1. The pump beam 15 enters the crystal at its front face 21 at a point A. Once sufficient lasing action is established along the ring 17, the output 19 is also through point A.

Figure 2:
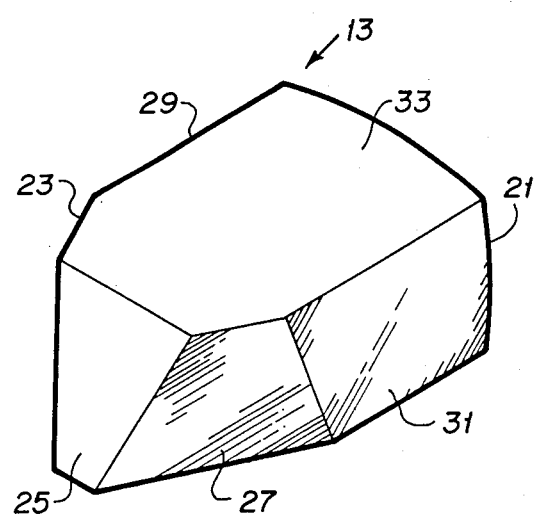
FIG. 2 is a schematic perspective view of the crystal laser medium and the magnetic field used in the laser of FIG. 1.
Figure 3:
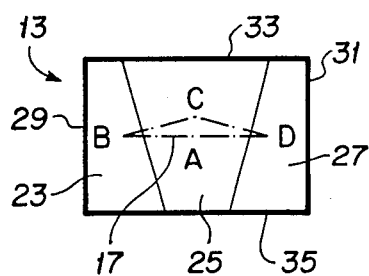
FIG. 3 is a schematic side view of the laser of FIG. 1 identifying an out-of-plane rotation angle.

The geometry of the preferred Nd:YAG crystal 13 is most clearly depicted in FIG. 2. The front face 21 is shown slightly curved. A first side face 29 extends between the front face 21 and the first bevel 23, while a second side face 31 extends between the front face 21 and the second bevel 27. The slanted rear face 25 extends between the first bevel 23 and the second bevel 27. As indicated in FIGS. 2 and 3, the front, rear, and side faces, and the bevels, are bounded by a top face 33 and a bottom face 35, which are substantially parallel to each other.

The rear face 25 and the bevels 23 and 27 are uncoated to provide for three total internal reflections (TIR). The front face 21 is coated to be primarily reflective so that the ring 27 can resonate, but is partially transmissive to admit the pump beam 15 and to permit the generation of the output 19.

The spherical curvature of the front face 21 provides for laser cavity stability. The output coupling mirror reflectivities are chosen to maximize the differential loss between counter-propagating modes with the additional constraint that the output coupling be less than 0.2% in order to have a low pump threshold. The laser 11 has s and p-polarization power reflectivities of 99.9% and 85% with a relative phase shift of 180°. A 180° is preferred because the low loss linear polarization remains an eigenmode of the ring when the Faraday rotation cancels rotations caused by the other cavity elements.

Threshold reduction is accomplished in part by reducing the output coupling from 1% to 0.2% and by reducing the mode volume, which is accomplished by reducing the size of the crystal, and thus the ring. The dimensions L and W shown in FIG. 1 are 6.0 mm and 4.88 mm, respectively. The radius of curvature of the output coupler is 20 mm.

Figure 4:
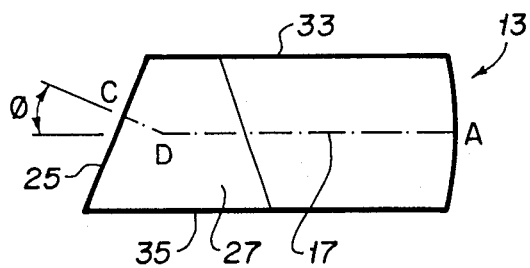
FIG. 4 is a schematic front view of the laser of FIG. 1.
Figure 5:
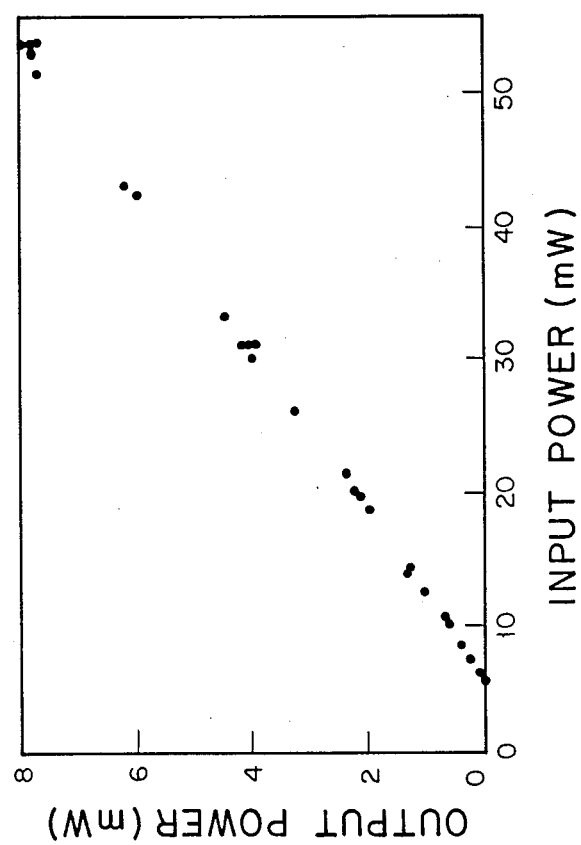
FIG. 5 is a graphic representation of the output power of a monolithic laser in accordance with the present invention as a function of pump power.

The ring 17 extends from output coupling point A on the front face, to a point B on the first bevel 23, to a point C on the rear face 25, to a point D on the second bevel 27, and from point D to point A again. Referring to FIG. 3, a small out-of-plane angle, $\phi$, defines the ring 17 as "quasi-planar". The quasi-planar character of the ring 17 is also indicated in FIG. 4. In accordance with the present invention, the opposing out-of-plane angle $\phi$ can be a small angle, less than 45°, and preferably less than 10°, to provide a low threshold for lasing using a magnetic field of relatively small magnitude.

The opposing out-of-plane angle, $\phi$, is selected to be between 0.5° and 2°, and is about 1.25° in the illustrated ring 17. This magnitude is selected as a compromise between the angle at which minimal light loss is imposed, this angle being less than 1°, and the angle at which maximum differential loss between counter propagating modes is achieved, e.g., around 6°.

The angle of the ring 17 at the output coupling point A is about 30°, which is selected to provide the desired coupling in relation to the refractive index of the crystal, which in the case of YAG is 1.82. The remaining angles are selected to obtain the 180° phase shift required to minimize light loss around the ring. In the present ring 17, the angle at opposing point C is about 54°, and the ring angles at the bevels are both 48°. The desired 180° total could also have been achieved using an about 46° angle at opposing point C and an about 52° angle at each bevel.

Using a modest magnetic field H of about 100 Gauss, a pump threshold of about 4.5 mW suffices to provide outputs at 1.319 $\mu$m and 1.338 $\mu$m. Single longitudinal mode lasing is consistently produced for both laser lines. When the pump beam is properly aligned and focussed, single transverse mode lasing can be obtained.

The unidirectional output power versus pump power supplied by the semiconductor laser pump 16 in the presence of a magnetic field of several hundred Gauss is shown in FIG. 4. Unidirectional lasing was observed up to the maximum available pump power of 60 mW. Above threshold, the slope efficiency is about 17%.

The 1.319 $\mu$m and the 1.338 $\mu$m lines are sufficiently far apart that they can be easily separated with a filter or grating to ensure a single frequency output. A magnetic field of up to several hundred Gauss can be provided by inexpensive steel permanent magnets. The 4.5 mW is readily surpassed by semiconductor lasers. The 1.319 $\mu$m and 1.338 $\mu$m outputs are readily supported by conventional optic fibers. These values constitute a distinct improvement over those of the disclosed MISER, which has a threshold pump power of 150 mW for the more efficiently producible 1.06 $\mu$m oscillation.

Pursuant to the foregoing, a monolithic single-mode unidirectional 1.319 $\mu$m and 1.338 $\mu$m Nd:YAG quasi-planar ring laser has been demonstrated. The quasi-planar design is an improvement in the MISER design in that both a low pump threshold and a low magnetic field requirement for unidirectional operation can be achieved easily. The diode laser pumped quasi-planar ring is a potential candidate for a compact, efficienct frequency source for high-baud rate heterodyne detection optical communications systems.

By way of explanation, and not of limitation, the following theoretical comparison of the subject quasi-planar design and the prior MISER design is provided. Briefly, the present invention provides better emulation of a discrete unidirectional ring laser. In either monolithic design, the partially reflective front surface serves as a partial polarizer and the crystal itself acts as a Faraday rotator when an appropriate magnetic field is applied. The purpose of the out-of-plane plane reflection is to emulate the half-wave plate of the discrete unidirectional ring laser.

In a discrete unidirectional ring laser, the half-wave plate is selected because the 180° phase shift it imposes most closely preserves the polarization of the light it operates upon. This is a condition for minimizing light loss over the ring.

The half-wave plate should be oriented so that, for one direction of propagation around the ring, the Faraday rotation is substantially cancelled. This condition corresponds to the condition of maximal differential loss between the propagation modes.

In the present embodiment, with a 6 mm length and a 100 gauss magnetic field, the Faraday rotation is quite small, e.g., about 0.007°. It follows that the relative inclination of the equivalent half-wave plate should be quite small. This small orientation differential is most directly achieved using the small out-of-plane angle provided by the quasi-planar configuration.

Figure 6A:
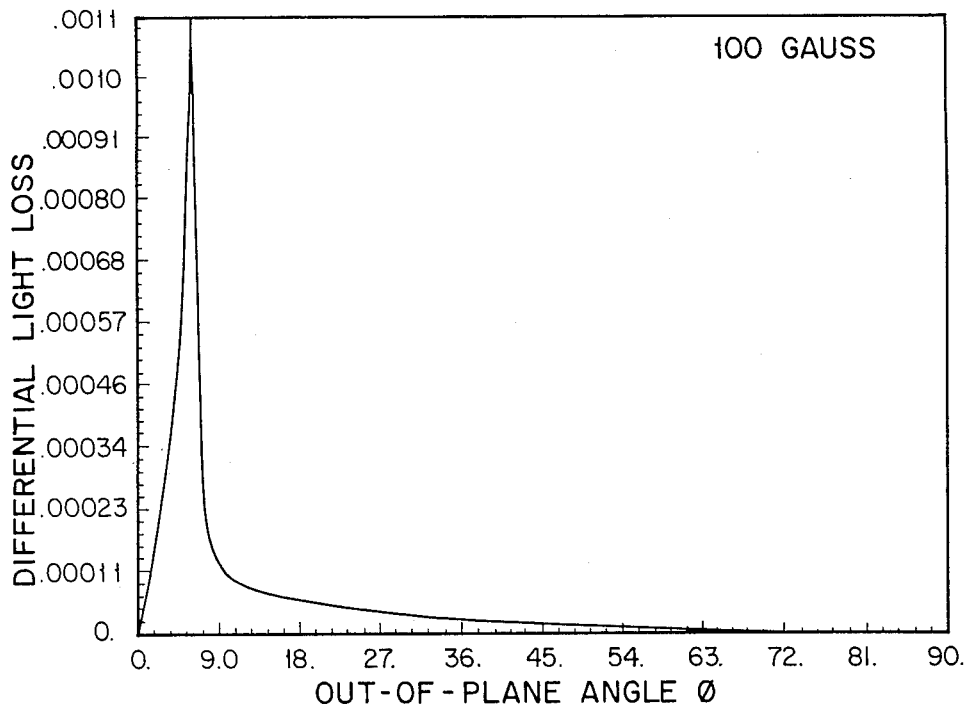
FIGS. 6A and 6B are graphic representations of differential light loss for opposing directions of propagation about a ring as a function of out-of-plane angle taken at two magnetic field intensities.
Figure 6B:
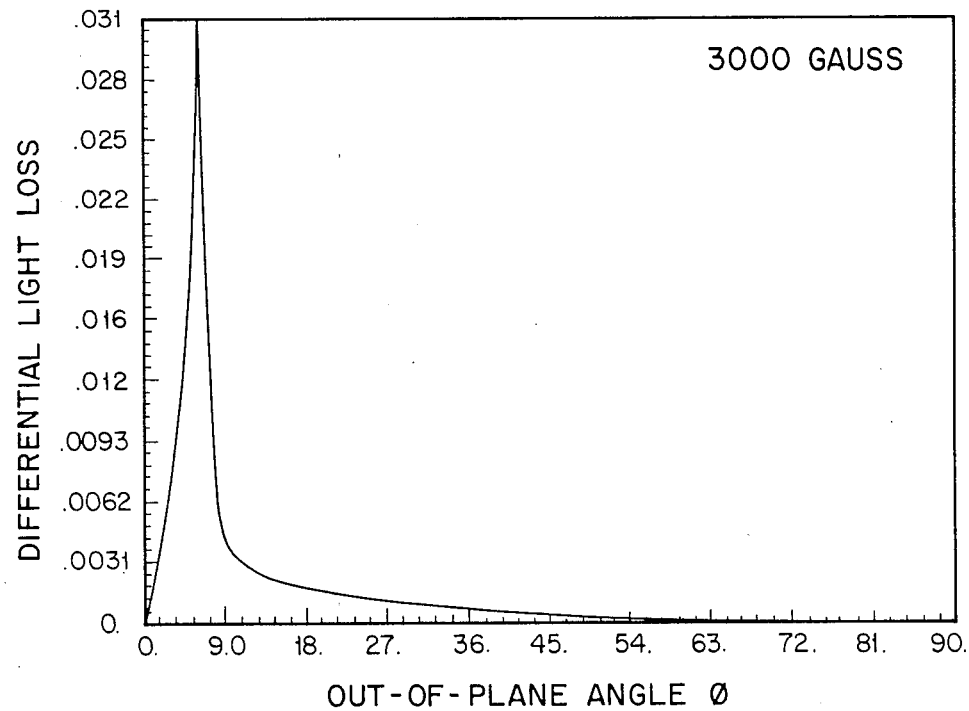

Differential loss between counter-propagating modes is plotted as a function of out-of-plane angle for crystals extending 6 mm along magnetic fields of 100 Gauss and 3000 Gauss, respectively, in FIGS. 6A and 6B. It can be seen that the peaks for these curves occurs at the out-of-plane angles less than 10°, or, more specifically for the illustrated configuration, at about 5°.

These peaks are significantly offset from the angles at which minimum round trip loss occurs. Minimum loss occurs at angles around 0.33° for 3000 Gauss and 0.01° for 100 Gauss. In order to keep the output coupling below 0.2%, a rotation angle of 1.25° was chosen. Empirical evidence indicates that a conservative estimate of the differential loss required for unidirectional operation is 0.01%. This is easily achieved by the design presented by FIG. 1. Thus, out-of-plane angles around 1° can serve as a workable compromise between the objectives of maximizing differential loss between counter-propagating modes, and minimizing loss in the supported mode.

As the out-of-plane angle approaches 90°, as in the disclosed MISER, both the differential loss between counter propagating modes and the gain for the supported mode are about as un-optimal as possible. When a Jones matrix analysis is applied to the geometry of the disclosed MISER, it is seen that the disclosed large out-of-plane angle most closely emulates a quarter-wave plate inclined at 20°, rather than a half-wave plate.

The 96° phase shift produced by the disclosed MISER more closely emulates a quarter-wave plate and nearly imposes maximal round trip loss in the supported mode. This partially explains the lower, i.e., about 5% efficiency of the MISER in comparison to the 17% efficiency of the quasi-planar design. The 20° effective incline is more than an order of magnitude greater than the Faraday rotation. Thus, percentagewise, the difference in round trip rotation in the counter-propagating modes is quite small. Thus differential loss is small and so the magnetic field requirement is large.

There is a trade-off between the goals of reducing threshold and maximizing the differential loss to achieve unidirectional oscillation. Reducing the ring size to reduce threshold decreases the Faraday rotation, which in turn reduces the differential loss. The disclosed MISER requires a relatively expensive rare earth permanent magnet, to provide the 3000 Gauss magnetic field to achieve its 150 mW threshold in a 38 mm long crystal.

The pump threshold for the MISER desing could be reduced by shortening the crystal. But if it were shortened to the 6 mm used in the illustrated quasi-planar device, the magnetic field required would be impracticable using permanent magnets. Permanent magnet technology would be further stained to achieve the preferred 1.3 μm outputs, instead of the four times more efficiently generated 1.06 μm output of the disclosed MISER.

By optimizing the out-of-plane angle, the quasi-planar design utilizes the available magnetic field 300 times more effectively than a MISER design using the approximately the same dimensions. Thus, for the quasi-planar monolithic unidirectional ring laser, both low threshold and unidirectional operation are readily achieved with a moderate magnetic field.

While the invention is described in the context of the foregoing embodiment, many alternative are provided for by the present invention. The out-of-plane angle can be varied to achieve different compromises between the objectives of maximizing the gain of the supported mode while maximizing the differential loss of the counter-propagating modes. The preferred reflection angles can be modified to accommodate competing design considerations. The three TIR surfaces can be rounded to provide additional mode stability. In fact, the three TIR reflections can be confined to a single curved single.

Different crystal host materials, shapes and dimensions can achieve the required ring geometry. For example, the laser medium can be neodymium-doped gadolinium garnet (Nd:GGG), which has a greater Verdet constant than Nd:YAG permitting smaller magnetic fields to yield equivalent Faraday rotations. Different doping materials with different wavelengths ranges are provided for. Different pumping schemes can be used. For example, the illustrated quasi-planar laser has been successfully pumped with a dye laser. Asymmetric rings and rings with more than four reflection points are possible. These and other modifications and variations are provided for by the present invention, the scope of which is limited only by the following claims.

What is claimed is:

1. A laser resonator comprising:
a solid-state laser medium;
means for defining within said solid-state laser medium a resonant unidirectional ring including at least four non-coplanar reflection vertices, the maximum minor angle defined by intersections of pairs of planes defined by respective sets of three of said reflection vertices being less than 45°.

2. The laser resonator of claim 1 further characterized in that said maximum is less than 10°.

3. The laser resonator of claim 1 further characterized in that said maximum is between 0.5° and 2°.

4. The laser resonator of claim 1 further characterized in that said laser medium includes a first surface and a second surface, said first and second surfaces being non-intersecting, said laser medium also including a third surface intersecting each of said first surface and said second surface so that said three surfaces collectively enclose said laser medium, all of said vertices of said ring lying on said third surface.

5. The laser resonator of claim 4 wherein said third surface includes a front face through which output coupling is effected at a first of said reflection points, a rear face including a second of said reflection points, and two other faces including respective third and fourth of said reflections points.

6. The laser resonator of claim 4 wherein the angle between the plane defined by said third, first and fourth reflections points and the plane defined by said third, second and fourth reflections points is non-zero and less than 45°.

7. The laser resonator of claim 4 wherein the angle defined therein is less than 10°.

8. The laser resonator of claim 4 wherein the angle defined therein is between about 0.5° and 2°.

9. A laser system comprising:
a monolithic solid-state laser medium;
reflective quasi-planar ring means for defining a non-planar ray path ring within said laser medium, said ring being characterized by a maximum out-of-plane angle of less than 45°;
pumping means; and
means for producing a magnetic field through said laser medium so as to induce differential light loss between the two senses of light travel along said ring.

10. The laser system of claim 9 further characterized in that said maximum is between about 0.5° and 2°.

11. The laser of claim 9 further characterized in that said laser medium includes a first surface and a second surface, said first and second surfaces being non-intersecting, said laser medium also including a third surface intersecting each of said first surface and said second surface so that said three surfaces collectively enclose said laser medium, all of said vertices of said ring lying on said third surface.

12. A laser resonator comprising:
a Nd:YAG crystal having a top face, a bottom face extending parallel to said top face, a front face, first and second side faces, first and second bevel faces, and a rear face, each said side faces being adjacent said front face and the respective bevel, each said bevel being adjacent the rear face, said front and rear faces and said bevels being internally reflective, said front face including an output coupling point, said rear face and each said bevel being oriented and including a respective reflection point so that a light ray from said output coupling point incident said reflection point on said first bevel is reflected toward said reflection point on said rear face so as to be reflected toward said reflection point on said second bevel so as to be reflected toward said output coupling point and so that a light ray from said output coupling point incident said reflection point on said second bevel is reflected toward said reflection point on said rear face so as to be reflected toward said reflection point on said first bevel so as to be reflected toward said output coupling point.

13. The laser resonator of claim 12 wherein the angle between the plane defined by said output coupling point and the reflection points on said bevels and the plane defined by said reflection point on said rear face and the reflection points on said bevels about 0.5° to 2°.

14. The laser resonator of claim 12 further comprising means for applying a magnetic field substantially in the direction defined between said output coupling point and said reflection point on said rear face.

15. The laser resonator of claim 12 further comprising a semiconductor laser arranged so as to pump said crystal so as to generate light from said output coupling means, said light primarily being characterized by at least one wavelength between 1.3 μm and 1.4 μm.

* * * * *